United States Patent Office 3,337,291
Patented Aug. 22, 1967

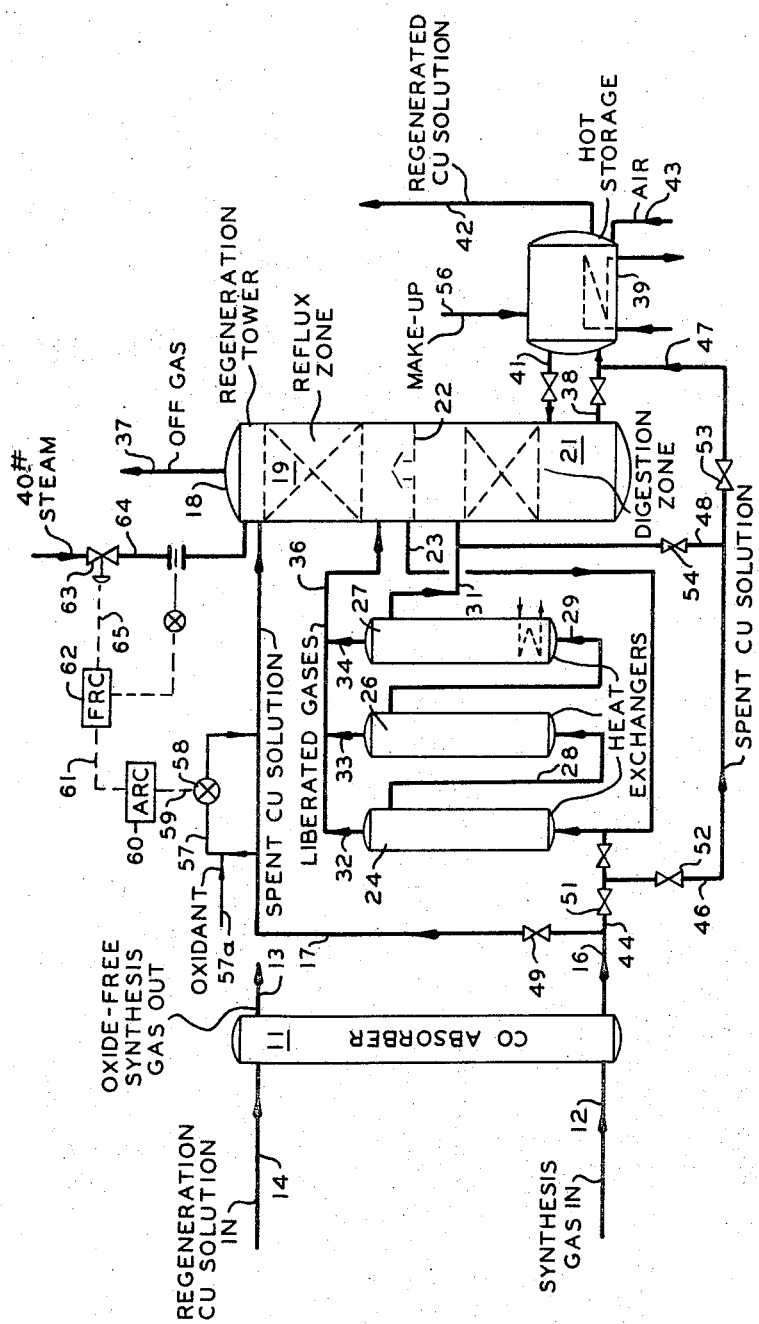

3,337,291
REGENERATION OF COPPER AMMONIUM SALT SOLUTIONS
Lawrence E. Clay, Pasadena, Tex., assignor to Phillips Petroleum Company, a corporation of Delaware
Filed July 5, 1963, Ser. No. 293,038
4 Claims. (Cl. 23—55)

This invention relates to the purification of ammonia synthesis gas. In one aspect it relates to the removal of carbon oxides from ammonia synthesis gas by treating said gas with copper ammonium salt solution, and regeneration and fortification of said salt solution. In still another aspect it relates to an improved process and apparatus for inhibition of copper carbonate formation in the solution regeneration steps.

Purification of ammonia synthesis gas to effect the removal of carbon oxides can be provided by contacting said gas with a copper ammonium salt solution. Following this operation the salt solution is customarily regenerated to remove absorbed carbon oxides, refortified with acid, ammonia, copper, etc., as required to maintain its strength, and reused for purification of additional synthesis gas. The cupric ion content of the copper salt solution, which is desirably maintained within a certain range and is lowered during the contacting process, is usually increased and controlled by introducing air to the copper ammonium salt solution in the regeneration system.

Ammoniacal copper solutions used to absorb carbon monoxide are regenerated by heating and allowing the solution to digest at elevated temperatures. During the heating step ammonia and carbon oxides are liberated as gases and most of the ammonia is reabsorbed by refluxing with unregenerated solution. Solution from the digestion stage of regeneration passes to storage and is recycled to the synthesis gas scrubbing tower.

Serious operating difficulty has been encountered when the total copper concentration, both cupric and cuprous ions, in the carbon oxides-rich salt solutions runs too high. This is manifested by build up of cuprous and cupric ammonium formates and carbonates in the upper portion of the regeneration vessel until venting of the liberated gases from the vessel via an overhead conduit is prevented by plugging.

It has been found that when the total copper content in the loaded salt solution exceeds a certain level, the carbonate deposition process is accelerated to a point where unacceptably frequent shutdown is required to clean out the upper regeneration vessel and overhead conduits. An early attempt to inhibit the carbonate build up problems involved the addition of weak aqua ammonia as solution diluent to the regenerated solution hot storage tank, whenever total copper concentration in the loaded salt solution was determined as exceeding a certain level. However, this required repeated manual sampling and laboratory analysis of a continuously flowing process stream, which still failed to give continuous salt deposition control in the regenerator.

It is, therefore, an object of this invention to provide improved process and apparatus for the regeneration and fortification of ammoniacal copper salt solution used in the absorption of carbon oxides from ammonia synthesis gas.

Still another object is to permit as high a cuprous and cupric ion concentration for efficient carbon oxides absorption as is consonant with smooth operation of the regeneration elements.

Yet another object is to substantially overcome the tendency toward cuprous and cupric carbonate deposition on the upper surfaces of the solution regeneration vessels.

These and other objects, aspects and advantages of the invention will become apparent from a study of the disclosure, the drawing and the appended claims to the invention.

I have found that excellent control of salt deposition from the carbon oxides-rich copper solution can be maintained by passing to the reflux stage of the regeneration vessel a stream of steam preferably continuously which serves to redissolve any carbonate precipitate, and partially diluting the salt solution, the copper concentration of which may have built up thru recycling of the copper salt solution.

According to the present invention a process and apparatus is provided comprising determining the total copper ion concentration in said carbon oxides-rich treating solution passing to said regeneration zone; and maintaining said copper concentration below a predetermined upper level by injecting steam into said upper portion to partially dilute said solution and to dissolve depositing copper carbonates, whereby interrupted operation of said regeneration zone is substantially avoided. In a preferred embodiment, this concentration measurement is done colorimetrically.

The synthesis of ammonia employing steam, air and natural gas is a well known process. The overall operation showing the major steps is depicted in the drawing and the accompanying description of U.S. Patent 2,930,672, issued Mar. 29, 1960. Referring now to the drawing for the description of the carbon monoxide removal process and copper treating solution regeneration, both carbon monoxide and carbon dioxide are absorbed in a treating step in tower 11 from the synthesis gas which enters at the bottom of the tower through line 12 and leaves through line 13 at the top of the tower for further processing. A treating solution, such as a solution of copper ammonium formate and/or copper ammonium carbonate, is fed by line 14 to the absorbed 11, and flows downwardly over vapor-liquid contacting media to absorb carbon monoxide and the carbon dioxide remaining after $CO_2$ absorption in an amine solution. Spent solution, which is designated hereinafter as unregenerated copper solution, leaves the absorber through line 16 and passes through line 17 to the regeneration tower 18.

The regeneration of treating solution is basically a heating step in which the solution is elevated to a temperature of about 160 to 180° F. for about 5 to 15 minutes. The pressure is generally atmospheric. During this period the carbon oxides are liberated, and cupric salts react with the last traces of carbon monoxide that were not vented to form carbon dioxide and cuprous ions. The solution is then substantially free of absorbed carbon monoxide and contains an equilibrium amount of carbon dioxide as the carbonate. The regenerated solution is cooled and returned to the absorption tower for removal of additional carbon monoxide. Preferably, the regeneration process involves three phases which are conveniently labeled (1) reflux, (2) heating and (3) digestion. In the reflux step, gases liberated in the heating and digestion steps are scrubbed with cold unregenerated solution to reabsorb ammonia vapors. The heating step is self-explanatory and the digestion phase allows the reactions of regeneration to proceed to completion.

The regeneration tower comprises a reflux zone 19 in which the unregenerated solution contacts gases comprising ammonia, carbon monoxide and carbon dioxide, absorbing from these gases most of the ammonia present. The lower section of the regeneration tower is the digestion zone 21, which is separated from the reflux zone by a doughnut tray 22 containing a capped chimney riser. Unregenerated solution flows to the top of the regeneration tower, through a spray head (not shown) and downwardly through the packed reflux section 19 to the tray 22. From the collecting tray the solution passes through line 23 to a series of heat exchangers 24, 26 and 27. Heat exchangers 24 and 26 effect heat exchange between the unregenerated solution and the regenerated solution from the storage tank as it passes back to the absorption tower. Additional indirect heating of the unregenerated solution is supplied by steam in heat exchanger 27. As the copper treating solution passes from the heat exchanger 24 through line 28 to exchanger 26 and thence through line 29 to exchanger 27, its temperature is elevated to that necessary for regeneration of the solution by reaction to liberate and/or oxidize the carbon monoxide absorbed in the treating step. This solution thus heated, passes by line 31 to the lower section, digestion zone 21, of the regeneration tower. This zone normally contains a packed section which effects contact between the entering liquid and rising vapors. In the heat exchangers, vapors of ammonia and carbon monoxide released pass from the exchangers through lines 32, 33 and 34 into line 36 and reenter the regeneration tower in the lower portion of reflux zone 19. Most of the ammonia is reabsorbed by unregenerated solution in the reflux zone, and the carbon oxides are passed through overhead line 37 for processing. Some flashing of carbon monoxide from spent treating solution passing into the upper portion of the regeneration tower occurs in the reflux section. It is desirable to maintain a low inlet solution temperature in order to avoid excessive ammonia losses. Solution from the digestion zone 21 passes through line 38 to hot storage tank 39 which provides additional regeneration time for the treating solution. Gases given off in the storage tank reenter the regeneration tower through line 41 and pass upwardly in contact with the treating solution. Regenerated solution is then passed from storage tank through line 42 and, following several cooling steps which include the heat exchange in exchangers 24 and 26, plus additional cooling, is returned to the absorption tower 11.

Several reactions take place in the regeneration system, but only the wet combustion process is considered in the reduction of cupric ion to cuprous. The wet combustion of carbon monoxide oxidizes the last traces of carbon monoxide and reduces cupric ion to cuprous. Without this reaction complete regeneration of the solution is practically impossible. The reaction is dormant at 32° F. but proceeds quite rapidly at 170° F. Since the wet combustion process is at the expense of the cupric ion, air can be admitted to the system to oxidize the cuprous ion to the cupric ion and maintain the cupric content above the desired lower limit. Air can be added to the system through line 43 to the hot storage tank or into the regeneration section of the tower.

The cupric ion content can be conveniently maintained below its upper limit. Such a control is effected by passing a portion of the unregenerated solution from line 16 through lines 44, 46 and 47 to storage tank 39, entering through line 38. In this way a portion of unregenerated solution containing higher amounts of absorbed carbon monoxide than the solution entering the digestion zone through line 31 is supplied to the regeneration section for reaction with the cupric ion. This control is surprisingly effective in reducing cupric ion concentration quickly and furthermore can be safely practised without endangering the absorption capacity of the treating solution with residual amounts of carbon monoxide. The unregenerated solution can also be introduced to the digestion zone 21 above the packed section through line 48 combining with the heated solution in line 31. Ordinarily bypassing up to 10 weight percent of the unregenerated solution in line 16 to the digestion zone 21, or to the storage tank 39 is sufficient to maintain the desired control. Setting valves 49, 51 and 52 in lines 17, 44 and 46, respectively, enables any desired fraction of the unregenerated solution to bypass both the reflux zone and the heat exchangers. By setting valves 53 and 54 in lines 47 and 48, respectively, the unregenerated solution can be added to the digestion zone 21, or to storage tank 39, or to both, in various ratios.

The effect of bypassing the reflux zone and heat exchangers in this manner is to decrease the cupric-cuprous ratio by reduction of cupric ion to cuprous. Since less solution is passing through the reflux zone in contact with the hot rising gases, the temperature in the reflux zone is elevated and some evaporation of water occurs. This is a convenient method to offset dilution of the solution by various sources, such as high moisture content in the feed synthesis gas, steam leaks in the heat exchanger 27, and steam introduced into reflux zone 19 by the practise of this invention. Naturally, the increased temperature in reflux zone 19 also results in higher ammonia losses, but dilution is the more serious problem. Solution make-up materials, such as ammonia and copper formate solution, can be added to the system as needed, via hot storage tank 39 through line 56.

Among the oxidants suitable for use in this invention are air, peroxides such as hydrogen peroxide and sodium peroxide, nitric acid, and other known oxidants, which would not interfere with upper concentration, when the colorimetric analysis method is used.

By practising the steps of my invention, a small stream of the carbon oxides-rich spent treating solution is continuously withdrawn from conduit 17 via bypass conduit 57. An oxidant, typically air, is introduced via conduit 57a into the sample stream, which is sufficient in amount to oxidize all of the cuprous ions in the sample stream to cupric ions, the latter being observable by their blue color. Preferably, a colorimeter 58 will determine the total copper ion concentration colorimetrically and transmit a signal via lead 59 to analyzer rate controller 60. ARC60 transmits a signal via line 61 to flow rate controller 62, to which motor valve 63 in steam feed conduit 64 is responsive via line 65. As the copper concentration rises in stream 17, the tendency toward increasing carbonate deposition in tower 18 is countered by increased steam flow.

A colorimeter 58 suitable for use in connection with the method of this invention is Model 77C Continuous Colorimeter of Beckman Instruments, Inc., Fullerton, Calif., which transmits an electrical signal, ARC60 is suitably a Type No. 152P Electronik Recording Pneumatic Controller of the Minneapolis-Honeywell Regulator Company, Philadelphia 44, Pa., which transmits a pneumatic signal, FRC60 is suitably a Foxboro Pneumatic Controller Model 58, available from the Foxboro Instruments Company, Foxboro, Mass., which transmits a pneumatic signal.

Although colorimetric determination of copper concentration is preferred, the present control method is not limited thereto. For example, transmitter 58 can conveniently be a Redox Meter, such as the Beckman Model WM, described on pages 21–1 to 21–3 of Bulletin 5480, of "The Industrial PH Handbook," published by Beckman Instruments, Inc., copyrighted 1957.

To more fully explain the process of my invention, a specific embodiment is discussed in connection therewith. About 22,700 pounds per hour of ammonia synthesis gas containing a 3 to 1 mol ratio of hydrogen to nitrogen with 7.2 weight percent carbon monoxide at 2.8 weight percent carbon dioxide is passed to an ammoniacal copper treating absorption tower at a pressure of about 1800 pounds per square inch gauge at 100° F. Approximately 90,000 pounds per hour of cold copper treating solution at about 40° F. having the composition shown in Table I is passed countercurrently over vapor-liquid contacting media to absorb the carbon monoxide and carbon dioxide from the synthesis gas. Synthesis process gas leaving the absorber 11 contains negligible amounts of carbon monoxide and carbon dioxide. Spent copper treating solution is regenerated by driving off the carbon oxides and the regenerated solution is cooled and returned to the absorption tower.

Unregenerated solution from the absorption tower is passed to a regeneration tower 18 and flows through a reflux zone to absorb ammonia from exhaust gases arising from storage tank 39. In the reflux system the solution is heated to about 100° F. and subsequently, further heat exchange is effected to bring the temperature of the solution up to about 170° F., at which the wet combustion process and other reactions of regeneration proceed quite rapidly. The hot copper solution passes through the digestion section of the regeneration tower to the storage tank where sufficient time is allowed to completely oxidize any remaining carbon monoxide present. Normally about 5 to 15 minutes is sufficient time to allow complete regeneration, although longer periods can be provided if desired. To control the ratio of cupric to cuprous ions in the range of about 1 to 5–7, a portion (less than 15 weight percent) of the solution from the reflux section bypasses the heat exchangers and is fed directly to the digestion zone where residual carbon monoxide effects further reduction of cupric ion present. Makeup ammonia is fed on a continuous basis at about 13 pounds per hour, and the proper cupric ion concentration is readily maintained by periodic analysis of the treating solution and corresponding adjustment of the stream from the reflux section which bypasses the heat exchangers. Composition of the copper solution from the hot storage tank is shown in Table I.

Table I.—Composition of copper solution in water in 46

| | Grams per liter |
|---|---|
| Cuprous | 120–125 |
| Cupric | 20–25 |
| Ammonia | 160–180 |
| Formic acid | 40–60 |
| Carbon dioxide | 80–120 |

The components of Table I are present in the solution as cuprous and cupric ammonium formates and carbonates, which are the deposition formers in the regeneration tower.

While the total copper concentration in stream 17 does not exceed 16 grams per 100 milliliters of carbon oxides-rich salt solution, then the set-point on ARC60 allows no signal via line 60 to actuate FRC60 to open motor valve 63. However, if the copper concentration rises above the aforedescribed level, then the control system permits steam typically at 40 p.s.i.g. to flow into the reflux zone to condense and inhibit carbonate deposition, the steam flow being related to the extent at which the total copper concentration exceeds the aforementioned level.

Reasonable variations and modifications are possible within the scope of the foregoing disclosure, the drawings and the appended claims to the invention.

I claim:

1. In a process for regenerating aqueous ammoniacal copper treating solution used to absorb carbon oxides wherein synthesis gas is introduced into a carbon oxide absorption column and contacted therein with ammoniacal copper treating solution to absorb carbon oxides from said synthesis gas and produce a spent treating solution which is then passed from said absorption column to the upper portion of a regeneration tower to remove said carbon oxides absorbed in said ammoniacal copper treating solution and produce a regenerated treating solution and said regenerated treating solution is cycled back to said absorption column, the improvement comprising: (a) continuously withdrawing a sample of said spent treating solution during the passage of said solution to the upper portion of said regeneration tower; (b) introducing an oxidant into said withdrawn sample in an amount sufficient to oxidize the cuprous ions in the sample to cupric ions; (c) automatically determining the total cupric ion concentration in the thus oxidized sample; and (d) injecting steam into said upper portion of said regeneration tower automatically in response to said cupric ion concentration as determined in (c), thereby preventing the buildup of copper carbonate deposits in said upper portion of said tower, said steam being introduced concurrently with said spent treating solution flowing into the upper portion of said regeneration tower, and varying the steam rate by increasing the steam rate in response to the rising cupric ion concentration in said spent treating solution.

2. A process according to claim 1 wherein said total cupric ion concentration is colorimetrically determined.

3. A process according to claim 1 wherein said steam is injected when the total cupric ion concentration in said oxidized sample exceeds a predetermined level and the steam flow is related to the extent said concentration exceeds said level.

4. A process according to claim 3 wherein said steam is injected into said upper portion of the regeneration tower at about 40 p.s.i.g. and said predetermined level is about 16 grams of copper per 100 milliliters of solution.

References Cited

UNITED STATES PATENTS

| 2,043,263 | 6/1936 | Porter | 23—2 |
| 2,930,672 | 3/1960 | Morris | 23—2 |
| 2,965,438 | 12/1960 | Mullen | 23—55 X |
| 3,006,717 | 10/1961 | Atkinson | 23—2 |

FOREIGN PATENTS 841,965   7/1960   Great Britain.

OSCAR R. VERTIZ, *Primary Examiner.*

MILTON WEISSMAN, *Examiner.*

B. H. LEVENSON, *Assistant Examiner.*